(No Model.)
J. R. NOBLE.
Cooking Vessel.
No. 229,450.  Patented June 29, 1880.
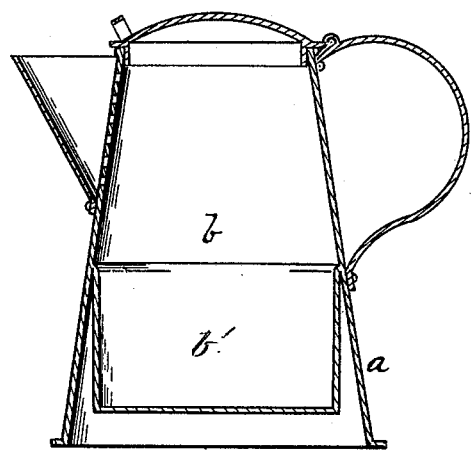
Witnesses,
Jno K. Smith
A. E. Schuldig
Inventor,
James R. Noble
by Bakewell & Kerr
Attorneys

United States Patent Office.

JAMES R. NOBLE, OF PITTSBURG, PENNSYLVANIA, ASSIGNOR TO MOORE NOBLE, OF SAME PLACE.

COOKING-VESSEL.

SPECIFICATION forming part of Letters Patent No. 229,450, dated June 29, 1880.

Application filed March 19, 1880. (No model.)

*To all whom it may concern:*

Be it known that I, JAMES R. NOBLE, of Pittsburg, in the county of Allegheny and State of Pennsylvania, have invented a new and useful Improvement in Cooking-Vessels; and I do hereby declare the following to be a full, clear, and exact description thereof, reference being had to the accompanying drawing, forming part of this specification, in which is shown a sectional view of a coffee-pot embodying my improvements.

My invention relates to the construction of that class of cooking-vessels wherein an annular inclosing-skirt is employed to facilitate the cooking by causing the heated air to impinge upon the sides of the cooking-vessel.

In the generality of cooking-vessels the bottom of the vessel is in direct contact with the flame, the top of the stove, or other fire-heated surface, and if the contents of the vessel are of a more or less solid character there is a tendency of the same to burn, and the uniform heating of the contents of the vessel is more or less retarded by the contact of the cool air with the sides of the vessel.

Heretofore these objections have been in a measure overcome by forming the vessel with an inclosing chamber or skirt, which in some instances extended the whole length or depth of the vessel, and was provided with air or draft holes to induce upward drafts of heated air around the inclosed vessel, and in other cases a short skirt extending but partially down the vessel has been employed, in which latter case the bottom of the vessel was not protected from the direct action of the flame or fire-heat, and the contents of the vessel, if solid, were liable to be burned. In either case a compact and symmetrical vessel adapted for table use was not obtained.

I do not herein claim the subject-matter above described, and have simply recited the same in order to more clearly distinguish my invention.

The object of my invention is to obtain a cheaply-constructed symmetrical vessel adapted by its form and finish for table use, and one in which the contents will be protected from the direct action of the fire-heat or flame, and the hot air will be confined around the base of the vessel for a sufficient height to act upon the liquid above the level of the solid contents of the pot; and to this end it consists in providing a coffee-pot or like vessel with a flange or skirt forming an annular hot-air chamber around the lower portion of the pot, and extending below the bottom, so as to raise the same above the stove or like fire-heated surface, said skirt being a continuation of the body of the pot or vessel, whereby exteriorly it will have the usual finished appearance, the cup-shaped bottom of the pot being subsequently inserted and secured by soldering or brazing the parts together, all as will hereinafter more fully appear.

I will now proceed to describe my invention, so that others skilled in the art to which it appertains may apply the same.

In the drawing, $b$ indicates the body, $b'$ the bottom, and $a$ the skirt or annular inclosing-flange, of my improved vessel. The body $b$ of the vessel is formed in the usual manner, except that it is extended down and slightly outward or flaring, to form a skirt, $a$, which is continuous with and of the same sheet of metal as the upper part of the vessel. This will give to the exterior of the vessel a finished and symmetrical appearance which cannot otherwise be obtained.

The cup-shaped bottom $b'$, having been properly shaped up or formed, and being made of such depth that it will terminate a short distance above the bottom edge of skirt $a$, is inserted within the skirt $a$ in the position and relation to the skirt and body $b$ of the vessel, substantially as shown in the drawing, and is then secured by soldering or brazing. In other respects the vessel may be finished in any of the ways well known to the trade.

The advantages of this construction are that, while the usual form and symmetry of the vessel are preserved, the contents of the pot, if of a solid or semi-solid nature, (such as coffee-grounds,) are prevented from burning while cooking, and the hot air, being brought in contact with the vessel above the grounds or solid contents, causes the liquid contents of the pot to heat more rapidly and uniformly.

Another advantage is that, when the vessel is removed from the fire and placed on a table or other surface, a closed hot-air space is formed around and below the bottom of the vessel, which prevents the rapid cooling of its contents.

Having thus described my invention, what I claim, and desire to secure by Letters Patent, is—

A culinary vessel adapted for table use, said vessel having a skirt extending from at or about its lower third below the bottom of the vessel, to form an air-chamber around and below the vessel, said skirt being continuous with the body or upper portion of the vessel, and the cup-shaped bottom being inserted from below and secured to the body and skirt by soldering or brazing, substantially as and for the purpose specified.

In testimony whereof I, the said JAMES R. NOBLE, have hereunto set my hand.

JMES R. NOBLE.

Witnesses:
  T. B. KERR,
  FRANK W. SMITH.